United States Patent [19]

Rose

[11] 4,303,557

[45] * Dec. 1, 1981

[54] ABRASION RESISTANT SPRAY DRIED ALUMINOSILICATE DETERGENT COMPOSITION

[75] Inventor: Terence J. Rose, Tervuren, Belgium

[73] Assignee: The Procter & Gamble Company, Cincinnati, Ohio

[ * ] Notice: The portion of the term of this patent subsequent to Feb. 7, 1995, has been disclaimed.

[21] Appl. No.: 189,869

[22] Filed: Sep. 23, 1980

Related U.S. Application Data

[63] Continuation of Ser. No. 853,674, Nov. 21, 1977, abandoned, which is a continuation of Ser. No. 631,030, Nov. 11, 1975, Pat. No. 4,072,621.

[30] Foreign Application Priority Data

Nov. 13, 1974 [GB] United Kingdom ............... 49174/74

[51] Int. Cl.$^3$ .......................... C02F 1/42; C11D 3/12; C11D 3/37; C11D 11/02

[52] U.S. Cl. .................................... 252/527; 252/131; 252/135; 252/140; 252/174; 252/174.15; 252/174.16; 252/174.19; 252/174.21; 252/174.24; 252/174.25; 252/179; 252/539; 252/540; 252/DIG. 1; 252/DIG. 2; 252/DIG. 15

[58] Field of Search ............... 252/131, 135, 140, 179, 252/527, 539, 540, 174, 714.15, 174.16, 174.21, 174.24, 174.25, DIG. 1, DIG. 2, DIG. 15

[56] References Cited

U.S. PATENT DOCUMENTS

| | | | |
|---|---|---|---|
| 3,308,067 | 3/1967 | Diehl . | |
| 3,794,605 | 2/1974 | Diehl . | |
| 3,799,880 | 3/1974 | Kelly et al. | 252/110 |
| 3,870,648 | 3/1975 | Grifo | 252/135 |
| 3,933,672 | 1/1976 | Bartolotta et al. | 252/116 |
| 3,985,669 | 10/1969 | Krummel et al. . | |
| 4,000,080 | 12/1976 | Bartolotia et al. . | |
| 4,083,793 | 4/1978 | Jakobi et al. | 252/99 |

FOREIGN PATENT DOCUMENTS

| | | |
|---|---|---|
| 819,611 | 3/1975 | Belgium . |
| 2,422,265 | 11/1974 | Fed. Rep. of Germany . |
| 7,403,381 | 10/1974 | Netherlands . |

*Primary Examiner*—Dennis L. Albrecht

[57] ABSTRACT

Detergent compositions containing particular water-insoluble metallo-silicate ion exchange builder materials, organic surface-active agents and a water-soluble vinyl copolymeric ingredient are provided. These compositions are capable of providing a cleaning performance, especially in hard water, which is substantially identical to what can be obtained from all polyphosphate built detergent compositions. Additionally, a process is disclosed for preparing detergent granules having improved physical properties, particularly breaking resistance and reduced dusting.

13 Claims, No Drawings

ABRASION RESISTANT SPRAY DRIED ALUMINOSILICATE DETERGENT COMPOSITION

This is a continuation of application Ser. No. 853,674, filed Nov. 21, 1977, now abandoned, which in turn is a continuation of Ser. No. 631,030, filed Nov. 11, 1975, now U.S. Pat. No. 4,072,621.

BACKGROUND OF THE INVENTION

One of the possible replacements for phosphate builders in synthetic detergent compositions is a water-insoluble metallo-silicate ion exchange material. Compositions containing such materials have been described in the published Dutch patent applications 74 03381, 74 03382 and 74 03383 filed by Henkel & Cie GmbH, and in the U.S. application Ser. Nos. 359,293 and 450,266 to Corkill et al.; 379,881 to Gedge et al.; 379,882 to Madison et al.; and 379,883 to Corkill et al.

Detergent compositions containing water-insoluble metallo-silicate ion exchange material tend to be less effective at high levels of water-hardness, particularly at levels above about 20° H, in presence of appreciable amounts of water-soluble orthophosphates or pyrophosphates. Such appreciable amounts of lower water-soluble phosphates can, for example, result from polyphosphate hydrolysis (reversion) occurring during conventional spray-drying.

It is also known that the processing of detergent compositions containing the water-insoluble alumino-silicate builders is difficult, whereas the formed detergent granules tend to give raise to dust problems during storage resulting from a marginal abrasion resistance.

Accordingly, it is an object of this invention to formulate detergent compositions containing water-insoluble metallo-silicate ion exchange materials capable of providing superior washing and cleaning performance over a large range of washing conditions.

It is a further object of this invention to formulate granular detergent compositions containing metallo-silicate ion exchange materials which exhibit improved physical characteristics, particularly abrasion resistance.

It is yet another object of this invention to provide an improved spray-drying process for detergent compositions containing water-insoluble metallo-silicate builders.

It is a more specific object of this invention to provide a detergent composition containing a metallo-silicate ion exchange material and appreciable amounts of an auxiliary orthophosphate or pyrophosphate builder and the performance of which is substantially unaffected by the level of water-hardness.

The above and other objects are now met as will be seen from the following disclosure.

SUMMARY OF THE INVENTION

The instant invention is based upon the discovery that cleaning and washing compositions comprising water-insoluble metallo-silicate ion exchange materials in combination with surface-active materials can be improved with respect to processing and cleaning by the incorporation of specific polymeric processing aids and cleaning adjuncts, especially when the composition is spray-dried, more especially when the composition is spray-dried and contains a nonionic surface-active material and especially when the composition contains appreciable amounts of an orthophosphate and pyrophosphate auxiliary builder. The detergent compositions of this invention provide good cleaning with reduced levels of polyphosphate builders.

In particular, the compositions of this invention comprise:

(a) from about 5% to about 93% by weight of a water-insoluble metallo-silicate ion exchange material of the formula $$M_z[(MeO_2)_z\cdot(SiO_2)_y]xH_2O$$

wherein M is an ion which will exchange readily with a calcium ion, Me is either aluminum or boron, z and y are each an integer, the molar ratio of z to y is in the range from about 2.5 to about 0.4, and X is an integer from about 2 to about 300; said metallo-silicate ion exchange material having a particle diameter of from about 0.1 micron to about 100 microns; a calcium ion exchange capacity of at least about 200 mg $CaCO_3$ eq./g; and a calcium ion exchange rate of at least about 2 grains/gallon/minute/gram;

(b) from about 5% to about 93% by weight of an organic surface-active agent selected from the group consisting of anionic, nonionic, ampholytic and zwitterionic surface-active agents and mixtures thereof; and (c) from about 0.10% to about 6% by weight of a water-soluble copolymer of:

(1) a vinyl compound having the general formula RCH=CHR wherein one R represents a hydrogen atom and the other R represents either an alkyl ether radical containing from 1 to about 4 carbon atoms or a hydrogen, and (2) maleic anhydride, or the corresponding water-soluble salts of said copolymer.

In a preferred embodiment, the water-insoluble metallo-silicate ion exchange material is represented by an alumino-silicate builder having a molar ratio of z to y in the range from about 1.0 to about 0.5, especially from about 1.0 to about 0.8.

Preferred surface-active agents herein include the condensation products of narrow distribution aliphatic alcohols having from 8 to 22 carbon atoms with ethylene oxide.

The copolymeric component is preferably used in an amount from about 0.25% to about 4% by weight.

The detergent compositions herein can contain, in addition to the essential components listed, various other ingredients commonly employed in detergent compositions. In a particularly preferred embodiment, auxiliary water-soluble detergent builders are employed in the compositions to aid in the removal of calcium hardness and to sequester magnesium cations in water. Such preferred co-builder systems for use in the compositions herein comprise well-defined and narrow ratios of the synthetic water-insoluble metallo-silicate to the co-builders.

DETAILED DESCRIPTION OF THE INVENTION

The compositions of this invention comprise (1) a water-insoluble metallo-silicate ion exchange material; (2) an organic surface-active agent and (3) a water-soluble copolymeric ingredient derived from a vinyl compound and maleic anhydride. The process aspect of this invention relates to a spray-drying process whereby detergent compositions containing major amounts of water-insoluble metallo-silicate ion exchange materials are incorporated in conjunction with specific other detergent composition ingredients to thereby provide a uniform granular composition having superior physical and cleaning performance properties.

The essential components of the compositions of this invention and the sequence of process steps required to prepare the subject compositions are discussed in detail hereinafter.

Unless specified to the contrary, the "percent" indications stand for percent by weight.

The compositions according to this invention comprise as a first essential component from about 5% to about 93%, preferably from about 5% to about 65%, and especially from about 10% to about 50% of a water-insoluble metallo-silicate ion exchange material having the general formula $$M_z[(MeO_2)_z.(SiO_2)_y]xH_2O$$

wherein M is a calcium exchangeable cation and Me is either aluminum or boron. The water-insoluble ion exchange material is additionally characterized by a molar ratio of z to y in the range from about 2.5 to about 0.4, preferably from about 1.0 to about 0.5, especially from about 1.0 to about 0.8; and x is an integer from about 2 to about 300, preferably from about 15 to about 264. The metallo-silicate ion exchange material is furthermore characterized by a particle size diameter from about 0.1 micron to about 100 microns, preferably from about 0.2 micron to about 10 microns. The term "particle diameter" herein represents the average particle diameter of a given ion exchange material as determined by conventional analytical techniques, such as, for example, microscopic determination and scanning electron microscope (SEM).

Although boron and aluminum species can meet the objects of this invention, aluminate ion exchange species are preferred.

The metallo-silicate ion exchange materials herein are also characterized by their calcium ion exchange capacity which is at least about 200 mg. calcium carbonate equivalent hardness/g of metallo-silicate, calculated on an anhydrous basis; the ion exchange capacity lies generally within the range from about 250 mg calcium carbonate equivalent/g to about 352 mg calcium carbonate equivalent/g.

The water-insoluble ion exchange materials herein are further characterized by their calcium ion exchange rate which is at least about 2 grains of calcium ions ($Ca^{++}$)/gallon/minute/grams of metallo-silicate (anhydrous basis); the ion exchange rate lies generally within the range of about 2 grains to about 6 grains of calcium ions ($Ca^{++}$)/gallon/minute/gram. Optimum builder performance for use herein is exhibited by metallo-silicate ion exchange material having a $Ca^{++}$ exchange rate of at least about 4 grains/gallon/minute/-gram. The ion exchange rate represents the reduction in the first minute of $Ca^{++}$ ion concentration from a 15 grains (US) gallon hardness solution as determined by $Ca^{++}$ electrode techniques.

The preferred metallo-silicate ion exchange materials herein are represented by alumino-silicate ion exchangers having a molar ratio of $AlO_2$:$SiO_2$ in the range from 1.0 to about 0.5, especially from about 1.0 to about 0.8. Highly preferred are species having a molar ratio of $AlO_2$:$SiO_2$ of about 1:1.

The metallo-silicate ion exchange materials are preferably used in the hydrated form. It is recognized that the use of the dehydrated species may provide some builder activity, however, optimum performance is normally obtained from hydrated species. The highly preferred water-insoluble alumino-silicate ion exchangers having a molar ratio of $AlO_2$:$SiO_2$ of about 1 usually contain from 10% to 28% of water, preferably from 10% to 22%.

The metallo-silicate builders suitable for use in the compositions of this invention can be represented by crystalline and/or amorphous species; the crystalline and amorphous properties can be asserted by microscopic examination or X-ray analysis. The crystalline species are preferred in the context of this invention.

The calcium exchangeable cation M can be represented by suitable organic and inorganic cations, particularly alkali metal ions, especially sodium.

The metallo-silicate ion exchange materials herein can be prepared by various processes which are known to be suitable for that purpose. Of course, these known processes have, if needed, to be adapted to provide a water-insoluble ion exchange material which corresponds to the characteristics enumerated hereinbefore. These variations in process parameters involve routine variations only and as such are well-known to the men of the art.

A particularly preferred species of water-insoluble alumino-silicate ion exchange material for use herein can be prepared according to the following procedure:

(a) dissolve sodium aluminate (Na $AlO_2$) in water to form a homogeneous solution having a concentration of Na $AlO_2$ to about 16.5% by weight (preferred);

(b) add sodium hydroxide to the sodium aluminate solution of step (a) at a weight ratio of NaOH:Na $AlO_2$ of 1:1.8 (preferred) and maintain the temperature of the solution at about 50° C. until all the NaOH dissolves and a homogeneous solution forms;

(c) add sodium silicate ($Na_2SiO_3$ having a $SiO_2$:$Na_2O$ weight ratio of 3.2 to 1) to the solution of step (b) to provide a solution having a weight ratio of $Na_2SiO_3$:NaOH of 1.14:1 and a weight ratio of $Na_2SiO_3$:$NaAlO_2$ of 0.63:1.

(d) heat the mixture prepared in step (c) to about 90° C.–100° C. and maintain at this temperature range for about one hour.

In a variation of the above process, the mixture of step (c) is cooled to a temperature of about 50° C. and thereafter filtered to collect the desired alumino-silicate solids. If the low temperature (<25° C.) crystallization technique is used, then the precipitate is filtered without additional preparatory steps. The filter cake can optionally be washed free of excess base (deionized water wash preferred to avoid cation contamination). The filter cake is dried to a moisture content of 18%–22% by weight using a temperature below about 150° C. to avoid excessive dehydration. Preferably, the drying is performed at 100° C.–105° C.

The highly preferred alumino-silicate prepared in the foregoing manner is characterized by a cubic crystal structure and may additionally be distinguished from other alumino-silicates on the basis of the X-ray powder diffraction pattern. X-ray analysis data for the above synthetic alumino-silicate were obtained on PHILIPS ELECTRONICS X-ray diffraction equipment. This included a nickel filtered copper target tube at about 1100 watts of input power. Scintillation detection with a strip chart recorder was used to measure the diffraction from the spectrometer. Calculation of the observed d-values was obtained directly from the spectrometer chart. The relative intensities were calculated with Io as the intensity of the strongest line or peak. The synthetic alumino-silicate ion exchange material having the formula $Na_{12}[(AlO_2)_{12}\cdot(SiO_2)_{12}].27H_2O$ prepared as described hereinbefore had the following X-ray diffraction pattern:

| d | I/Io | d | I/Io |
|---|---|---|---|
| 12.3 | 100 | 2.41 | 1 |
| 8.67 | 70 | 2.37 | 4 |
| 7.14 | 35 | 2.29 | 1 |
| 6.35 | 1 | 2.25 | 4 |
| 5.50 | 25 | 2.18 | 8 |
| 5.04 | 2 | 2.15 | 10 |
| 4.36 | 6 | 2.11 | 4 |
| 4.11 | 35 | 2.09 | 4 |
| 3.90 | 2 | 2.06 | 10 |
| 3.71 | 50 | 1.92 | 8 |
| 3.42 | 16 | 1.90 | 4 |
| 3.29 | 45 | 1.86 | 2 |
| 3.08 | 2 | 1.84 | 4 |
| 2.99 | 55 | 1.76 | 2 |
| 2.90 | 10 | 1.74 | 14 |
| 2.76 | 12 | 1.69 | 6 |
| 2.69 | 4 | 1.67 | 2 |
| 2.62 | 20 | 1.66 | 2 |
| 2.52 | 6 | 1.63 | 4 |
| 2.47 | 4 | | |

The above diffraction pattern substantially corresponds to the pattern of ASTM powder diffraction card file 11-590.

Water-insoluble alumino-silicates having a molar ratio of $(AlO_2)$:$(SiO_2)$ smaller than 1, i.e. in between 1.0 and about 0.5, preferably in between 1.0 and about 0.8, can be prepared in a similar manner.

Examples of alumino-silicates having a molar ratio:$AlO_2$:$SiO_2 < 1$, suitable for use in the instant compositions include:

$Na_{86}[(AlO_2)_{86}(SiO_2)_{106}].264H_2O$; and
$Na_6[(AlO_2)_6(SiO_2)_{10}].15H_2O$ The ion exchange materials prepared in the foregoing manner can be employed in laundering liquors at levels of from about 0.005% to about 1.0% of the liquor, and reduce the hardness level, particularly calcium hardness, to a range of about 1 to 3 grains/gallon within about 1 to about 3 minutes. Of course, the usage level can depend on the original hardness of the water and the desires of the user.

The detergent compositions of the instant invention can contain all manner of organic, water-soluble surface-active agents, inasmuch as the metallo-silicate ion exchangers are compatible with all such materials. The surface-active component is used in an amount from about 5% to about 93%, preferably from about 5% to about 65%, especially from 10% to 50% of the detergent compositions. A typical listing of the classes and species of detergent compounds useful herein appears in U.S. Pat. No. 3,664,961, incorporated herein by reference. The following list of detergent compounds and mixtures which can be used in the instant compositions is representative of such materials, but is not intended to be limiting.

Water-soluble salts of the higher fatty acids, i.e. "soaps", are useful as the detergent component of the compositions herein. This class of detergents includes ordinary alkali metal soaps such as the sodium, potassium, ammonium and alkylolammonium salts of higher fatty acids containing from about 8 to about 24 carbon atoms and preferably from about 10 to about 20 carbon atoms. Soaps can be made by direct saponification of fats and oils or by the neutralization of free fatty acids. Particularly useful are the sodium and potassium salts of the mixtures of fatty acids derived from coconut oil and tallow, i.e. sodium or potassium tallow and coconut soap.

Another class of detergents includes water-soluble salts, particularly the alkali metal, ammonium and alkylolammonium salts, of organic sulfuric reaction products having in their molecular structure an alkyl group containing from about 8 to about 22 carbon atoms and a sulfonic acid or sulfuric acid ester group. (Included in the term "alkyl" is the alkyl portion of acyl groups.) Examples of this group of synthetic detergents which form a part of the detergent compositions of the present invention are the sodium and potassium alkyl sulfates, especially those obtained by sulfating the higher alcohols ($C_8$–$C_{18}$ carbon atoms) produced by reducing the glycerides of tallow or coconut oil; and sodium and potassium alkyl benzene sulfonates, in which the alkyl group contains from about 9 to about 15 carbon atoms, in straight chain or branched chain configuration, e.g. those of the type described in U.S. Pat. Nos. 2,220,099 and 2,477,383. Especially valuable are linear straight chain alkyl benzene sulfonates in which the average of the alkyl groups is about 13 carbon atoms, abbreviated as $C_{13}$LAS.

Other anionic detergent compounds herein include the sodium alkyl glyceryl ether sulfonates, especially those ethers of higher alcohols derived from tallow and coconut oil; sodium coconut oil fatty acid monoglyceride sulfonates and sulfates; and sodium or potassium salts of alkyl phenol ethylene oxide ether sulfate containing about 1 to about 10 units of ethylene oxide per molecule and wherein the alkyl groups contain about 8 to about 12 carbon atoms.

Nonionic synthetic detergents are also useful as the detergent component of the instant composition. Such nonionic detergent materials can be broadly defined as compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield compounds having the desired degree of balance between hydrophilic and hydrophobic elements.

For example, a well-known class of nonionic synthetic detergents is made available on the market under the trade name of "Pluronic". These compounds are formed by condensing ethylene oxide with a hydrophobic base formed by the condensation of propylene oxide with propylene glycol. Other suitable nonionic synthetic detergents include the polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol.

The condensation product of aliphatic alcohols having from 8 to 22 carbon atoms, in either straight chain or branched configuration, with ethylene oxide, e.g., a coconut alcohol-ethylene oxide condensate having from 2 to 30 moles of ethylene oxide per mole of coconut alcohol, the coconut alcohol fraction having from 10 to 14 carbon atoms, are also useful nonionic detergents herein.

Semi-polar nonionic detergents include water-soluble amine oxides containing one alkyl moiety of from about 10 to 28 carbon atoms and 2 moieties selected from the group consisting of alkyl groups and hydroxyalkyl groups containing from 1 to about 3 carbon atoms; water-soluble phosphine oxide detergents containing one alkyl moiety of about 10 to 28 carbon atoms and 2 moieties selected from the group consisting of alkyl groups and hydroxyalkyl groups containing from about 1 to 3 carbon atoms; and water-soluble sulfoxide detergents containing one alkyl moiety of from about 10 to 28 carbon atoms and a moiety selected from the group consisting of alkyl and hydroxyalkyl moieties of from 1 to 3 carbon atoms.

Ampholytic detergents include derivatives of aliphatic or aliphatic derivatives of heterocyclic secondary and tertiary amines in which the aliphatic moiety can be straight chain or branched and wherein one of the aliphatic substituents contains from about 8 to 18 carbon atoms and at least one aliphatic substituent contains an anionic water-solubilizing group.

Zwitterionic detergents include derivatives of aliphatic quaternary ammonium, phosphonium and sulfonium compounds in which the aliphatic moieties can be straight chain or branched, and wherein one of the aliphatic substituents contains from about 8 to 18 carbon atoms and one contains an anionic water solubilizing group.

Other useful detergent compounds herein include the water-soluble salts of esters of $\alpha$-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; water-soluble salts of olefin sulfonates containing from about 12 to 24 carbon atoms; and $\beta$-alkyloxy alkane sulfonates containing from about 1 to 3 carbon atoms in the alkyl group and from about 8 to 20 carbon atoms in the alkane moiety.

Preferred water-soluble organic detergent compounds herein include linear alkyl benzene sulfonates containing from about 11 to 14 carbon atoms in the alkyl group; the tallow range alkyl sulfates; the coconut alkyl glyceryl sulfonates; alkyl ether sulfates wherein the alkyl moiety contains from about 14 to 18 carbon atoms and wherein the average degree of ethoxylation varies between 1 and 6; the sulfated condensation products of tallow alcohol with from about 3 to 10 moles of ethylene oxide; olefin sulfonates containing from about 14 to 16 carbon atoms; alkyl dimethyl amine oxides wherein the alkyl group contains from about 11 to 16 carbon atoms; alkyldimethylammino-propane-sulfonates and alkyl-dimethyl-ammonio-hydroxy-propane-sulfonates wherein the alkyl group in both types contains from about 14 to 18 carbon atoms; soaps, as hereinabove defined; the condensation product of tallow fatty alcohol with about 11 moles of ethylene oxide; and the condensation product of a $C_{13}$ (avg.) secondary alcohol with 9 moles of ethylene oxide.

Specific preferred detergents for use herein include:- sodium linear $C_{10}$–$C_{18}$ alkyl benzene sulfonate; triethanolamine $C_{10}$–$C_{18}$ alkyl benzene ulfonate; sodium allow alkyl sulfate; sodium coconut alkyl glyceryl ether sulfonate; the sodium salt of a sulfated condensation product of a tallow alcohol with from about 3 to about 10 moles of ethylene oxide; the condensation product of a coconut fatty alcohol with about 6 moles of ethylene oxide; the condensation product of tallow fatty alcohol with about 11 moles of ethylene oxide; 3-(N,N-dimethyl-N-$C_{12-16}$alkylammonio)-2-hydroxy-propane-1-sulfonate; 3-(N,N-dimethyl-N-$C_{12-16}$alkylammonio-propane-1-sulfonate; 6-(N-dodecylbenzyl-N,N-dimethylammonino)-hexanoate; dodecyl dimethyl amine oxide; coconut alkyl dimethyl amine oxide; and the water-soluble sodium and potassium salts of higher fatty acids containing 8 to 24 carbon atoms.

It is to be recognized that any of the foregoing detergents can be used separately herein or as mixtures. Examples of preferred detergent mixtures herein are as follows.

An especially preferred alkyl ether sulfate detergent component of the instant compositions is a mixture of alkyl ether sulfates, said mixture having an average (arithmetic mean) carbon chain length within the range of from about 12 to 16 carbon atoms, preferably from about 14 to 15 carbon atoms, and an average (arithmetic mean) degree of ethoxylation of from about 1 to 4 moles of ethylene oxide, preferably from about 2 to 3 moles of ethylene oxide.

Specifically, such preferred mixtures comprise from about 0.05% to 5% by weight of mixture of $C_{12-13}$ compounds, from about 55% to 70% by weight of mixture of $C_{14-15}$ compounds, from about 25% to 40% by weight of mixture of $C_{16-17}$ compounds and from about 0.1% to 5% by weight of mixture of $C_{18-19}$ compounds. Further, such preferred alkyl ether sulfate mixtures comprise from about 15% to 25% by weight of mixture of compounds having a degree of ethoxylation of 0, from about 50% to 65% by weight of mixture of compounds having a degree of ethoxylation from 1 to 4, from about 12% to 22% by weight of mixture of compounds having a degree of ethoxylation from 5 to 8 and from about 0.5% to 10% by weight of mixture of compounds having a degree of ethoxylation greater than 8.

Examples of alkyl ether sulfate mixtures falling within the above specified ranges are set forth in Table I.

TABLE I

| MIXTURE CHARACTERISTIC | ALKYL | ETHER | SULFATE | MIXTURE |
|---|---|---|---|---|
| | I | II | III | IV |
| Average carbon chain length (No. C Atoms) | 14.86 | 14.68 | 14.86 | 14.88 |
| 12–13 carbon atoms (wt. %) | 4% | 1% | 1% | 3% |
| 14–15 carbon atoms (wt. %) | 55% | 65% | 65% | 57% |
| 16–17 carbon atoms (wt. %) | 36% | 33% | 33% | 38% |

TABLE I-continued

| MIXTURE CHARACTERISTIC | ALKYL | ETHER | SULFATE | MIXTURE |
|---|---|---|---|---|
| 18-19 carbon atoms (wt. %) | 5% | 1% | 1% | 2% |
| Average degree of ethoxylation (No. Moles EO) | 1.98 | 2.25 | 2.25 | 3.0 |
| 0 moles ethylene oxide (wt. %) | 15% | 21% | 22.9% | 18% |
| 1-4 moles ethylene oxide (wt. %) | 63% | 59% | 65% | 55% |
| 5-8 moles ethylene oxide (wt. %) | 21% | 17% | 12% | 22% |
| 9+ moles ethylene oxide (wt. %) | 1% | 3% | 0.1% | 5% |
| Salt | K | Na | Na | Na |

Particularly preferred for use herein are nonionic surface-active agents. The like nonionic components are mostly represented by condensates of a hydrophobic chain with a hydrophilic alkoxylate group. These materials are either water-soluble or water-insoluble. Examples of the like preferred nonionic surfactants include: water-insoluble organic surfactants having the formula $R(OC_xH_{2x})_n OH$ wherein R represents an alkyl or alkenyl group having from 8 to 22 carbon atoms or an alkylated or alkenylated phenyl group having from 6 to 12 carbon atoms in the alkyl or alkenyl group, x is 2 or 3 and n ranges from 1 to 8 and having a hydrophilic-lipophilic balance (HLB) of less than 10.0; an ethoxylated material consisting essentially of a mixture of components having at least two levels of ethylene oxide addition and having the formula $R_1$-$R_2$-$O(CH_2CH_2O)_nH$ wherein $R_1$ is a linear alkyl residue and $R_2$ has the formula —$CHR_3CH_2$—, $R_3$ being selected from the group consisting of hydrogen and mixtures thereof with not more than 40% by weight of lower alkyl, wherein $R_1$ and $R_2$ together form an alkyl residue having a mean chain length in the range of 8–15 carbon atoms, at least 65% by weight of said residue having a chain length within ±1 carbon atom of the mean, wherein $3.5 < n < 6.5$, provided that the total amount by weight of components in which n=0 shall be not greater than 5% and the total amount by weight of components in which n=2–7 inclusive shall be not less than 63%, based on the total weight of the or each said ethoxylate material, and the HLB of the or each said ethoxylate material shall lie in the range from 9.5–11.5; a nonionic polyethoxy surfactant having a HLB in the range from 11:14.5 in conjunction with a component of the formula

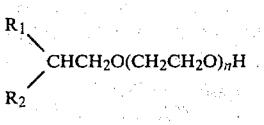

wherein $R_1$ is a straight chain alkyl group, $R_2$ is H or —$CH_3$, the total number of carbon atoms in $R_1$ and $R_2$ is from 10 to 13, $R_2$ is $CH_3$ in from 40% to 60% by weight of the corresponding unethoxylated alcohols, and the average degree of ethoxylation n is from 2.5 to 4; and a nonionic polyethoxy surfactant having a HLB in the range from 11:14.5 in conjunction with a nonionic surfactant of the formula

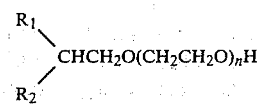

wherein $R_1$ is a straight chain alkyl group, $R_2$ is H or —$CH_3$, the total number of carbon atoms in $R_1$ and $R_2$ is from 10 to 13, $R_2$ is $CH_3$ in from 15% to 30% by weight of the unethoxylated alcohols, and the average degree of ethoxylation n is from 3 to 4. Another especially preferred nonionic species for use herein can be represented by the condensation product of a synthetic fatty alcohol having from 12 to 16 carbon atoms, predominantly 14 to 15 carbon atoms in a molar ratio of about 2:1 to about 1:2 with an average of about 4 to 9 ethylene oxide groups, preferably 6 or 7 ethylene oxide groups.

For use in suds regulated detergent compositions it may be desirable to adapt nonionic surface-active condensation products of fatty alcohols and alkoxides by esterifying or etherifying the terminal alcohol function with a suitable reactant such as, for example, carboxylic acids having from 1 to 4 carbon atoms. Other suitable alkylating agents such as anhydrides or acid chlorides may be used as well.

A further essential component herein is represented by a water-soluble derivative of a copolymer of a (1) vinyl compound having the general formula RCH=CHR wherein one R represents a hydrogen atom and the other R represents either an alkyl radical containing from one to about 4 carbon atoms or a hydrogen atom; and (2) maleic anhydride The copolymeric vinyl ingredient is used in an amount from about 0.1% to about 6%, preferably from 0.25% to 4%.

Specific examples of copolymeric ingredients for use herein include a watersoluble acid, an alkali-metal salt of that acid, an ester, or a $C_{1-2}$ alkyl-or alkylolamide of a maleic anhydride-vinyl $C_{1-4}$ alkyl ether copolymer. The degree of polymerization of said copolymer adequately soluble under regular use conditions—is difficult to establish. There is a recognized correlation between the viscosities of polymeric compounds and their relative molecular weight or degree of polymerization. Therefore, since viscosity figures are generally more meaningful and can be obtained easily, the copolymers described in the present application are characterized either in terms of their specific viscosity or in centipoises, whereby the figures given pertain to the anhydride form.

The specific viscosity of the anhydride form of the maleic anhydride-vinyl $C_{1-4}$ alkyl ether copolymer preferably varies between 0.1 to 6.0, most preferably between 0.2 and 5.0; the specific viscosity is defined by measuring the viscosity of the solution of 1 g of the anhydride-copolymer in 100 cc methylethylketone in a Cannon-Fenske (Series 100) viscosity meter at 25° C.

The copolymer which is used in the composition of the invention is preferably the sodium and potassium salt. Another valuable copolymer is the primary or secondary $C_{1-2}$ alkyl amide or $C_{1-2}$ alkylolamide and especially the mono- and diethanolamide. The ester derivative of the copolymer is either the $C_{1-10}$ and preferably the $C_{1-4}$ aliphatic alcohol reaction product, or the reaction product of the copolymer and a water-soluble organic compound having at least one reactive hydroxyl radical, for example, the water-soluble condensation product of 6 to 25 moles of ethylene oxide with a $C_{6-18}$ aliphatic alcohol, with a $C_{4-12}$ alkyl-substituted phenol, with condensated propylene oxide, or with the reaction product of propylene oxide and ethylene diamine. Preferably only 5 to 60% of the carboxylic acid radicals of the copolymer are esterified or reacted with a $C_{1-2}$ alkyl- or alkylolamine. The ratio of of the monomers in the copolymers may vary from 2:1 to 1:2, but is preferably 1:1.

The detergent compositions of the present invention preferably contain, in addition to the metallo-silicate ion exchange builders, auxiliary, water-soluble builders such as those taught for use in detergent compositions. Such auxiliary builders can be employed to aid in the sequestration of hardness ions and are particularly useful in combination with the preferred alumino-silicate ion exchange builders in situations where magnesium ions contribute significantly to water hardness. Such auxiliary builders can be employed in concentrations of from about 5% to about 50% by weight, preferably from about 10% to about 40% by weight, of the detergent compositions herein to provide their auxiliary builder activity. The auxiliary builders herein include any of the conventional inorganic and organic water-soluble builder salts.

Such auxiliary builders can be, for example, water-soluble salts of phosphates, pyrophosphates, orthophosphates, polyphosphates, phosphonates, carbonates, polyhydroxysulfonates, polyacetates, carboxylates, polycarboxylates and succinates. Specific examples of inorganic phosphate builders include sodium and potassium tripolyphosphates, pyrophosphates, phosphates, and hexametaphosphates. The polyphosphates specifically include, for example, the sodium and potassium salts of ethylene diphosphonic acid, the sodium and potassium salts of ethane 1-hydroxy-1, 1-diphosphonic acid and the sodium and potassium salts of ethane-1,1,2-triphosphonic acid. Examples of these and other phosphorus builder compounds are disclosed in U.S. Pat. Nos. 3,159,518, 3,213,030, 3,422,021, 3,422,137, 3,400,176 and 3,400,148, incorporated herein by reference.

Non-phosphorus containing sequestrants can also be selected for use herein as auxiliary builders.

Specific examples of non-phosphorus, inorganic auxiliary detergent builder ingredients include water-soluble inorganic carbonate and bicarbonate salts. The alkali metal, e.g. sodium and potassium, carbonates and bicarbonates are particularly useful herein.

Water-soluble, organic auxiliary builders are also useful herein. For example, the alkali metal, ammonium and substituted ammonium polyacetates, carboxylates, polycarboxylates and polyhydroxysulfonates are useful auxiliary builders in the present compositions. Specific examples of the polyacetate and polycarboxylate builder salts include sodium, potassium, lithium, ammonium and substituted ammonium salts of ethylene diamine tetraacetic acid, nitrilotriacetic acid, oxydisuccinic acid, melletic acid, benzene polycarboxylic acids, and citric acid.

Highly preferred non-phosphorus auxiliary builder materials herein include sodium carbonate, sodium bicarbonate, sodium citrate, sodium oxydisuccinate sodium mellitate, sodium nitrilotriacetate, and sodium ethylenediaminetetraacetate, and mixtures thereof.

Other highly preferred auxiliary builders herein are the polycarboxylate builders set forth in U.S. Pat. No. 3,308,067, Diehl, incorporated herein by reference. Examples of such materials include the water-soluble salts of homo- and co-polymers of aliphatic carboxylic acids such as maleic acid, itaconic acid, mesaconic acid, fumaric acid, aconitic acid, citraconic acid, methylenemalonic acid, 1,1,2,2-ethane tetracarboxylic acid, dihydroxy tartaric acid and keto-malonic acid.

Additional preferred auxiliary builders herein include the water-soluble salts, especially the sodium and potassium salts, of carboxymethyloxymalonate, carboxymethyloxysuccinate, cis-cyclohexanehexacarboxylate, cis-cyclopentanetetracarboxylate and phloroglucinol trisulfonate.

Specific examples of highly preferred phosphorus containing auxiliary builder salts for use herein include alkali pyrophosphates whereby the weight ratio of ion exchange material to pyrophosphate is within the range from about 1:2 to about 2:1. Additional preferred auxiliary co-builders such as the alkali salts of sodium tripolyphosphates and nitrilotriacetic acid provide equally superior performance for a weight ratio of ion exchange material to auxiliary builder salt in the range from about 1:1 to about 1:3. The preferred ion exchange alumino-silicates in combination with citrate auxiliary builder salts will provide superior free metal ion depletion in washing liquor when the alumino-silicates used have a molar ratio of $AlO_2$: $SiO_2$ of 1:1. It is understood that in the above preferred ranges of auxiliary builder to alumino-silicate the builder component can be represented by mixtures of said builders.

The detergent compositions herein containing the metallo-silicate ion exchange builder and the auxiliary, water-soluble builder are useful by virtue of the fact that the metallo-silicate preferentially adsorbs calcium ion in the presence of the auxiliary builder material. Accordingly, the calcium hardness ions are primarily removed from solution by the metallo-silicate while the auxiliary builder remains free to sequester other polyvalent hardness ions, such as magnesium and iron ions.

Another aspect of this invention is the provison of a process for spraydrying, by conventional means, the detergent compositions containing the metallo-silicate ion exchange materials of this invention. The presence of the copolymeric ingredient as defined hereinbefore in the composition permits processing at a wider range of conditions. Specifically the process comprises:

preparing a mixture comprising:

(1) from about 4% to about 50% by weight of a metallo-silicate ion exchange material as hereinbefore described, (2) from about 4% to about 40% by weight of a water-soluble organic surface-active agent as hereinbefore described, (3) from about 4% to about 50% by weight of an auxiliary builder especially those selected from the group consisting of sodium nitrilotriacetate, tripolyphosphate, pyrophosphate, or mixtures thereof, (4) from about 25% to about 50% by weight of water, (5) from about 0.10% to about 6% by weight of the polymer hereinbefore described; and, if desirable, (6) other customary ingredients, e.g. brighteners, in the usual quantities;

heating said mixture in a conventional detergent crutcher to a temperature of from about 60° C. to about 100° C.; and spray-drying said mixture in a conventional spray-drying tower with an air inlet temperature of from about 200° C. to about 310° C.

The advantage of adding the polymer processing aid is apparent in the quality of the resulting product. Without the processing aid the product is more dusty, more fragile, and has poorer flow characteristics. With the polymer the product has improved physical characteristics including improved flow.

From a process standpoint, the process variables can be varied over wider ranges to provide a variety of product characteristics without adversely affecting the integrity and other physical characteristics of the resulting granule and the normal fluctuations of the process are less likely to cause unacceptable variations in the product quality.

Heretofore it was not appreciated that the presence of the metallo-silicate ion exchange material would destabilize the spray-drying process and that the polymer material would correct this problem. This problem is especially severe with nonionic detergent compositions.

The detergent compositions herein can contain all manner of additional materials commonly found in laundering and cleaning compositions. For example, it can be desirable to add low levels of alkali metal silicates with a view to reduce the agglomeration tendency of the ion-exchangers while at the same time providing anti-corrosion properties.

The alkali metal silicate solids are used in an amount from about 0.5% to about 3%, preferably from about 0.9% to about 2%. Suitable silicate solids have a molar ratio of $SiO_2$/Alkali $metal_2O$ in the range from about 0.5 to about 4.0, preferably from about 1.5 to about 3.2. Such compositions can also contain thickeners and soil suspending agents such as carboxymethylcellulose and the like. Enzymes, especially the proteolytic and lipolytic enzymes commonly used in laundery detergent compositions, can also be present herein. Various perfumes, optical bleaches, fillers, anti-caking agents, fabric softeners and the like can be present in the compositions to provide the usual benefits occasioned by the use of such materials in detergent compositions. It is to be recognized that all such adjuvant materials are useful herein inasmuch as they are compatible and stable in the presence of the alumino-silicate ion exchange builders.

The granular detergent compositions herein can also advantageously contain a peroxy bleaching component in an amount from about 3% to about 40% by weight, preferably from about 8% to about 35% by weight. Examples of suitable peroxy bleach components for use herein include perborates, persulfates, persilicates, perphosphates, percarbonates and more in general all inorganic and organic peroxy bleaching agents which are known to be adapted for use in the subject compositions.

The compositions of this invention can require the presence of a suds regulating or suppressing agent.

Suds regulating components are normally used in an amount from about 0.001% to about 5%, preferably from about 0.05% to about 3% and especially from about 0.10% to about 1%. The suds suppressing (regulating) agents which are known to be suitable as suds suppressing agents in detergent context can be used in the compositions herein.

Particularly preferred for use herein are silicone suds suppressing agents and mixtures of chemically or physically bound silicones and silica. In more detail the silicone-based suds controlling agents which are suitable for use in the instant compositions can be represented by:

(1) silicones. In industrial practice the term "silicone" has come to be a generic term covering all high molecular weight polymers containing siloxane units and organic groups, in which the siloxane unit -Si-O-constitutes the continuing backbone.

The silicones useful in the present invention are high molecular weight linear or cyclic polymers, in which the -SO-O- unit constitutes the continuing backbone, and in which the organic substituents are saturated and unsaturated $C_{1-4}$ alkyl radicals, optionally substituted by a hydroxyl group, aryl radicals or mixtures thereof. Preferred are dimethyl, also called polydimethyl siloxanes, and methylphenyl, also called polymethylphenyl siloxanes, whereby the molecular weight ratio of the hydrocarbon radical to the atomic weight of the silicon atom varies between 0.5/1 and 6/1, most preferably between 1.8/1 and 2.2/1, having a viscosity between 5 and 500,000 centistokes, preferably between 200 and 25,000 centistokes at 25° C. The polysiloxanes can contain solid particles consisting of high molecular weight matrixed polysiloxanes.

The silicones useful herein optionally but preferably contain other siliceous material such as finely particulated inorganic silica, for example, in the form of a siliceous aerogel. The addition of up to 20%, preferably, from 3% to 10%, calculated on the weight of the silicone, of silica or silicon dioxide is recommendable to obtain excellent suds controlling results. The particle size of the silica dioxide is normally below about 25 mμ, preferably between 10 and 20 mμ; the silica dioxide in addition preferably has a specific surface area above about 50 $m^2/g$. If desired, the silica dioxide can be replaced, in whole or in part, by an equivalent amount of a solid oxide having physical characteristics similar to those of silica dioxide. Examples of the like solid oxides include titanium dioxide and alumina.

(2) silicone-silica compounds. The silicone-silica compounds useful in the present invention consist of silicones to which finely divided inorganic silica or silicon dioxide is bound chemically; thus the polymeric silicone consists of a continuing backbone of siloxane units which is interrupted by silicon dioxide particles, as for example described in U.S. Pat. No. 3,388,073. The weight ratio of silicone to silica in this chemically-bound silicone-silica suds regulating agent can vary between about 99:1 to about 70:30, preferably from about 94:6 to about 75:25. Highly preferred for use in the compositions herein is a chemically-bound silicone-silica compound having a weight ratio of silicone to silica from about 88:12 to about 80:20.

(3) silanated silica. Silanated silica useful in the present invention can be made by reacting a silica, produced, for example, by vapor-phase hydrolysis of silicon tetrachloride, with, for instance, dimethyl dichlorosilane, or by physically affixing silica to a polysilicone as described in the U.S. Pat. No. 3,207,698.

The silanated silica to be used in the present invention preferably has a median particle size of from 10 mμ to 1μ, and a specific surface area above 50 $m^2/g$. The very preferred silanated silica has a median particle size between 10 and 50 mμ, and a specific surface area above 100 $m^2/g$. Preferably the 1% by weight suspension of the silanated silica in a 1:1 water-isopropyl alcohol mixture has a pH above about 7.

Preferred siliceous suds controlling agents are 3:1 to 1:2 mixtures by weight of silicones, preferably dimethyl- and methylphenyl silicones as defined under (1) and (2) hereinabove having a viscosity of about 1,000 to about 5,000 centistokes at 25° C. and containing about 3% to 5% of finely divided silica, and silanated silica, as defined under (3) hereinabove, preferably having a median particle size of 10–25 mμ, and a specific surface area above 200 $m^2/g$.

The silicones and mixtures thereof as described in the above are normally used in the compositions of this invention in an amount from about 0.01% to 1.0%, preferably from about 0.05% to about 0.3%.

The terminology "polysiloxane" and "silicone" is used interchangeably and accordingly represents identical materials.

Microcrystalline waxes having a melting point in the range from 35°–115° C. and saponification value of less than 100 represent an additional example of a preferred suds regulating component for use in the subject compositions. The microcrystalline waxes are substantially water-insoluble, but are water-dispersible in the presence of organic surfactants. Preferred microcrystalline waxes have a melting point from about 65° C. to 100° C., a molecular weight in the range from 400–1,000; and a penetration value of at least 6, measured at 77° F. by ASTM-D1321. Suitable examples of the above waxes include: microcrystalline and oxidized microcrystalline petrolatum waxes; Fischer-Tropsch and oxidized Fischer-Tropsch waxes; ozokerite; ceresin; montan wax; beeswax; candelilla; and carnauba wax.

Alkyl phosphate esters represent an additional preferred suds suppressant for use herein. These preferred phosphate esters are predominantly monostearyl phosphate which, in addition thereto, can contain di- and tristearyl phosphates and monooleyl phosphates, which can contain di- and trioleyl phosphates.

The alkyl phosphate esters frequently contain some trialkyl phosphate. Accordingly, a preferred phosphate ester can contain, in addition to the monoalkyl ester, e.g. monostearyl phosphate, up to about 50 mole percent of dialkyl phosphate and up to about 5 mole percent of trialkyl phosphate.

The detergent compositions herein are employed in aqueous liquors to cleanse surfaces, especially fabric surfaces, using any of the standard laundering and cleansing techniques. For example, the compositions herein are particularly suited for use in standard automatic washing machines at concentrations of from about 0.01% to about 1.2%. Optimal results are obtained when the compositions herein are employed in an aqueous laundry bath at a level of at least about 0.10%, preferably 0.5%.

The detergent compositions containing such materials have a pH in the range of from about 8.0 to about 12, preferably about 9.0 to about 10.6. As in the case of other standard detergent compositions, the compositions herein function optimally within the basic pH range to remove soils, e.g. triglyceride soils and stains. While the metallo-silicates herein inherently provide a basic solution, the detergent compositions comprising the metallo-silicate and the organic detergent compound can additionally contain from about 5% to about 25% by weight of a pH adjusting agent. Such compositions can, of course, contain the auxiliary builder materials and optional ingredients as hereinbefore described. The pH adjusting agent used in the preferred compositions are selected such that the pH of a 0.05% by weight aqueous mixture of said composition is in the range from about 9.0 to about 10.6.

The optional pH adjusting agents useful herein include any of the water-soluble, basic materials commonly employed in detergent compositions. Typical examples of such water-soluble materials include the sodium phosphates; sodium hydroxide; potassium hydroxide; triethanolamine; diethanolamine; ammonium hydroxide and the like. Preferred pH adjusting agents herein include sodium hydroxide and triethanolamine.

The following examples illustrate the invention and facilitate its understanding.

A detergent base powder having the following formula was prepared by dry-mixing

COMPOSITION A

| Ingredient | % by wt. |
|---|---|
| Sodium salt of linear dodecylbenzene sulfonate | 8.0 |
| Condensation product of tallow alcohol and 11 moles of ethylene oxide ($TAE_{11}$) | 1.70 |
| Saturated fatty acid having from 18 to 22 carbon atoms | 3.50 |
| Sodium tripolyphosphate | 20.0 |
| $Na_{12}(AlO_2)_{12}(SiO_2)_{12} \cdot 27H_2O$ (*) | 17.0 |
| Sodium perborate tetrahydrate | 32.0 |
| Sodium sulfate | 5.0 |
| Sodium silicate solids (ratio: $SiO_2$:$Na_2O$ = 1.8) | 2.0 |
| Moisture and miscellaneous | balance to 100 |

(*) Average particle size: 1.8 microns

To simulate spray-drying, the sodium tripolyphosphate was in part substituted by ortho- and pyrophosphate.

To appreciate the performance advantages of the compositions of this invention, comparative soil suspension tests were carried out whereby varying levels of a vinyl copolymeric ingredient were added to the detergent base powder.

The testing method and conditions were as follows: The product to be tested was dissolved in distilled water to provide a 2% solution. 6 ml of that solution were combined with 5 ml of a 0.1% solution of Ultra Marine Blue (simulated soil) in distilled water and the volume made up to 20 ml with a concentrated hardness solution (ratio Ca/Mg=5:1) to the desired degree of hardness. The test tubes containing the solution were briefly shaken, immediately, after 30 minutes and after 2 hours to thereby facilitate the contact between the water hardness, dye and product.

After 2 hours, the solutions were filtered through a 2 inches diameter hole covering a white terry cotton strip. The strip was left to dry naturally and the loss in whiteness reflectance was read on a HARRISON reflectometer. A reference sample was carried along containing all ingredients except hardness.

A fully phosphate built sample having a composition similar to composition A above except that the metallo-silicate ion exchange material was replaced by increasing the amount of sodium tripolyphosphate to 32% (commercial detergent brand) was carried along for additional reference.

The following compositions were tested

| Example | Composition | |
|---|---|---|
| — | I | Composition A wherein 20% of the sodium tripolyphosphate were reverted to give a mixture of sodium pyrophosphate and sodium orthophosphate in a weight ratio of 6:1. |
| — | II | As I above except that 40% of the sodiumtripolyphosphate were reverted. |
| 1 | III | As I above to which 1% maleic anhydride-vinylmethylether copolymer, converted to the sodium salt, were added (calculated on anhydride basis) |
| 2 | IV | As I above except that 2% of the copolymeric material, converted to the sodium salt, were added (calculated on anhydride basis) |
| 3 | V | As I above except that 3% of the copolymer material, converted to the sodium salt, were added (calculated on anhydride basis) |
| 4 | VI | As II above to which 1% maleic anhydride-vinylmethylether copolymer, converted to the sodium salt, were added (calculated on anhydride basis) |
| 5 | VII | As II above to which 2% of the copolymeric material, converted to the sodium salt, were added (calculated on anhydride basis) |
| 6 | VIII | As II above to which 3% of the copolymeric material, converted to the sodium salt, were added (calculated on anhydride basis) |
| — | IX | Commercial reference product. |

The testing results were as follows

| Test hardness in °CLARK (14.3 ppm $CaCO_3$) COMPOSITION | Loss in Reflectance Units compared to Hardness-free Control 15°H | 25°H | 35°H |
|---|---|---|---|
| I | 4.5 | 36 | 89 |
| II | 3.5 | 74.5 | 68.5 |
| Example 1 | 9.5 | 18.5 | 17 |
| Example 2 | 8.5 | 8 | 10 |
| Example 3 | 8 | 11 | 13 |
| Example 4 | 2 | 15 | 14 |
| Example 5 | 1.5 | 19.5 | 15 |
| Example 6 | 5.5 | 20 | 14 |
| VIII | 8.5 | 14 | 7 |

The above results demonstrate the advantages derivable from the compositions of this invention versus what is obtained from prior art compositions (I, II). The high performance is furthermore evident by comparing to an all-phosphate detergent which is ecologically less desirable.

Additional compositions were prepared by adding to the detergent base powder Composition A a carboxymethylcellulose soil suspending agent. The whiteness maintenance was measured with a HARRISON reflectometer as described hereinbefore. The formulae tested had the following compositions:

| Example | Composition | |
|---|---|---|
| — | VIII | see above |
| — | II | see above |
| 5 | VII | see above |
| — | IX | As II above whereby 3% of carboxymethylcellulose were added as soil suspending agent |
| — | I | see above |

| Test hardness in °CLARK (14.3 ppm $CaCO_3$) COMPOSITION | Loss in Reflectance Units compared to Hardness-free Control 25°H | 35°H |
|---|---|---|
| VIII | 6 | — |
| II | 14 | 89 |
| VII | 7 | −2 |

-continued

| Test hardness in °CLARK (14.3 ppm $CaCO_3$) COMPOSITION | Loss in Reflectance Units compared to Hardness-free Control 25°H | 35°H |
|---|---|---|
| IX | 4 | 28 |

The above results demonstrate the advantages of this invention, particularly by comparison to the performance shortcomings of a similar composition containing a widely used detergent soil-suspending agent.

A granular detergent base powder was prepared having the following formula:

COMPOSITION B

| Ingredient | % by weight |
|---|---|
| Condensation product of 7 moles of ethylene oxide with a 1:1 blend of fatty alcohols having 14 and 15 carbon atoms | 12.0 |
| Sodium tripolyphosphate | 20.0 |
| Sodium perborate tetrahydrate | 23.0 |
| $Na_{12}(AlO_2)_{12}(SiO_2)_{12} \cdot 27\ H_2O$ (*) | 20.0 |
| Sodium carboxymethylcellulose | 1.0 |
| Sodium silicate solids (ratio $SiO_2/Na_2O$ = 2.0) | 6.0 |
| Sodium sulfate | 12.0 |
| Moisture and miscellaneous | balance to 100 |

(*) Average particle size : 2.2 microns

For the reasons set out for Composition A above, the sodium tripolyphosphate was in part substituted by ortho- and pyrophosphate.

Comparative performance evaluations were made thereby using the method described for Compositions I–IX hereinbefore.

For additional reference, a fully phosphate built detergent having a composition similar to Composition B above except that the alumino-silicate ion exchange material was replaced by sodium tripolyphosphate be increasing the latter component to 36% was parallel tested.

The following compositions were tested:

| Example | Composition | |
|---|---|---|
| — | X | Composition B wherein 40% of the sodium tripolyphosphate were reverted to give a mixture of sodium pyrophosphate and sodium orthophosphate in a weight ratio of 6:1 |
| 7 | XI | As X above to which 1% maleic anhydride-vinylmethylether copolymer, converted to the sodium salt, were added (calculated on anhydride basis) |
| 8 | XII | As XI above using 2% of the copolymeric ingredient instead of 1% |
| 9 | XIII | As XI above using 3% of the copolymeric ingredient instead of 1% |
| — | XIV | Fully phosphate built (36%) product. |

The testing results were as follows:

| Test hardness in °CLARK (14.3 ppm $CaCO_3$) | Loss in Reflectance Units compared to Hardness-free Control | | |
|---|---|---|---|
| COMPOSITION | 15° H | 25° H | 35° H |
| X | 12.5 | 83 | 43.5 |
| Example 7 | −3 | 12.5 | 4 |
| Example 8 | −2 | 1 | 3 |
| Example 9 | −1 | 12 | 5 |
| XIV | 1 | 1 | 24 |

These tests confirm the superior performance derived from the nonionic actives containing compositions of this invention over similar metallo-silicate ion exchange material containing compositions. It is also shown that in water having a high degree of hardness, the compositions herein containing nonionic surfactants are unexpectedly superior over fully phosphate built compositions.

What we claim is:

1. A spray-dried granular detergent composition capable of rapidly reducing the free polyvalent metal ion content of an aqueous solution, comprising:

(a) from about 5% to about 65% by weight of a water-insoluble hydrated metallo-silicate ion exchange material of a formula $$M_z[(MeO_2)_z.(SiO_2)_y]\ xH_2O$$

wherein M is an alkali metal ion, Me is aluminum; the molar ratio of z to y is in the range from about 0.8 to about 1.0, and x is an integer from about 15 to about 264, said metallo-silicate ion exchange material having a particle size diameter of from about 0.1 micron to about 10 microns; a calcium exchange capacity of at least about 200 mg.$CaCO_3$ eq./g.; and a calcium ion exchange rate of at least about 2 grains $Ca^{++}$/gallon/minute/gram;

(b) from about 5% to about 65% by weight of an organic surface active agent selected from the group consisting of anionic and nonionic surface-active agents and mixtures thereof; said anionic surface-active agents being selected from the group consisting of water-soluble salts of sulfates or sulfonates of reaction products having an alkyl group containing from about 8 to 22 carbon atoms and mixtures thereof; said nonionic surface active agents being selected from the group consisting of condensation products of synthetic fatty alcohols having from about 12 to about 16 carbon atoms with an average of about 4 to about 9 moles of ethylene oxide and the condensation product of tallow fatty alcohol with 11 moles of ethylene oxide and mixtures thereof; and (c) from about 0.10% to about 6% by weight of a water-soluble derivative of a copolymer of (1) a vinyl compound having the general formula RCH═CHR wherein one R represents a hydrogen atom and the other R represents an alkyl ether radical containing one carbon atom, and (2) maleic anhydride;

the ratio of (1) to (2) being 2:1 to 1:2; the anhydride form of the maleic anhydride-vinyl alkyl ether copolymer having a specific viscosity (defined by measuring the viscosity of the solution of one gram of said anhydride form in 100 cc methylethylketone in a Cannon-Fenske Series 100 viscosity meter at 25° C.) ranging from 0.1 to 6.0;

(d) from about 0.5% to about 3% alkali metal silicate solids having a molar ratio of $SiO_2$/alkali metal$_2$O in the range from about 0.5 to about 4.0.

2. The composition in accordance with claim 1 wherein the water-soluble copolymeric derivative is present in an amount from about 0.25% to about 4% by weight.

3. The composition in accordance with claim 1 wherein the surface-active agent is present in an amount from about 10% to about 50% by weight.

4. The composition in accordance with claim 3 which in addition contains from about 5% to about 50% by weight of an auxiliary builder salt selected from the group consisting of sodium tri-polyphosphate, sodium carbonate, sodium bicarbonate, sodium citrate, sodium oxydisuccinate, sodium mellitate, sodium nitrilotriacetate, sodium ethylenediaminetetraacetate, sodium polymaleate, sodium polyitaconate, sodium polymesaconate, sodium polyfumarate, sodium polyaconitate, sodium polycitraconate, sodium polymethylenemalonate sodium carboxymethyloxymalonate, sodium carboxymethyloxysuccinate, sodium ciscyclohexanehexacarboxylate, cis-cyclopentanetetracarboxylate, and sodium phloroglucinol trisulfonate.

5. The composition in accordance with claim 4 which in addition contains from about 0.001% to about 5% by weight of a suds suppressing agent selected from the group consisting of: saturated fatty acids having from 18 to 22 carbon atoms; silicones; microcrystalline waxes having a melting point in the range from 35° C.-115° C. and a saponification value of less than 100; alkylphosphate esters and mixtures thereof.

6. A composition in accordance with claim 5, wherein the suds suppressing agent is selected from the group consisting of (a) a polysiloxane, having a viscosity in the range of from 200 to 25,000 centistokes at 25° C.;

(b) a polysiloxane-silica mixture containing from 3% to 10% by weight calculated on the mixture of said polysiloxane and said silica, of finely particulated silica;

(c) a chemically bound silicone-silica compound having a weight ratio of silicone to silica from 99:1 to 70:30;

(d) a mixture of polysiloxane as defined in (a) and (b) and silanated silica;

(e) a microcrystalline wax having a melting point in the range from about 65° C. to about 100° C.;

(f) an alkyl phosphate ester component selected from the group consisting of stearyl acid phosphate and oleyl acid phosphate; and (g) mixtures thereof.

7. A composition in accordance with claim 6, wherein the suds suppressing agent is used in an amount from about 0.05% to about 3% by weight.

8. A composition in accordance with claim 1, wherein the ratio of vinyl methyl ether to maleic anhydride in the water-soluble copolymeric derivative is 1:1.

9. A composition in accordance with claim 8, in which the copolymeric derivative is the sodium salt.

10. A composition in accordance with claim 9, in which the ion exchange material comprises Zeolite A.

11. A composition in accordance with claim 10 wherein the organic surface active agent comprises dodecyl benzene sulfonate.

12. A composition in accordance with claim 10 wherein the organic surface active agent comprises the condensation product of tallow fatty alcohol with 11 moles of ethylene oxide.

13. A composition in accordance with claim 10 wherein the organic surface active agent comprises the condensation product of 7 moles of ethylene oxide with a 1:1 blend of fatty alcohols having 14 and 15 carbon atoms.

* * * * *